United States Patent
Howard

(10) Patent No.: US 6,433,333 B1
(45) Date of Patent: Aug. 13, 2002

(54) INFRARED SENSOR TEMPERATURE COMPENSATED RESPONSE AND OFFSET CORRECTION

(75) Inventor: Philip E. Howard, Hacienda Heights, CA (US)

(73) Assignee: DRS Sensors & Targeting Systems, Inc., Anaheim, CA (US)

( * ) Notice: Subject to any disclaimer, the term of this patent is extended or adjusted under 35 U.S.C. 154(b) by 0 days.

(21) Appl. No.: 09/518,344

(22) Filed: Mar. 3, 2000

(51) Int. Cl.[7] .................................................. G01J 5/02
(52) U.S. Cl. ................................ 250/252.1; 250/339.04
(58) Field of Search ..................... 250/339.03, 339.04, 250/252.1

(56) References Cited

U.S. PATENT DOCUMENTS

| | | |
|---|---|---|
| 5,420,421 A | * 5/1995 | Lindgren et al. ........ 250/252.1 |
| 5,471,240 A | 11/1995 | Prager et al. |
| 5,563,405 A | 10/1996 | Woolaway et al. |
| 5,631,466 A | 5/1997 | Botti et al. |
| 5,693,940 A | 12/1997 | Botti et al. |
| 5,756,999 A | 5/1998 | Parrish et al. |
| 6,230,108 B1 | * 5/2001 | Matsuda ...................... 702/99 |

FOREIGN PATENT DOCUMENTS

JP          05180698 A   *  7/1993  ............. G01J/5/10

* cited by examiner

Primary Examiner—Constantine Hannaher
(74) Attorney, Agent, or Firm—Norris, McLaughlin & Marcus

(57) ABSTRACT

A system and method are provided for use with an uncooled infrared sensor. The system and method include a temperature compensated performance algorithm which is utilized to provide temperature compensated response and offset correction coefficients which are applied to a video signal of the infrared sensor to correct for variations in the video signal caused by temperature changes of the sensor.

9 Claims, 5 Drawing Sheets

FIG 4
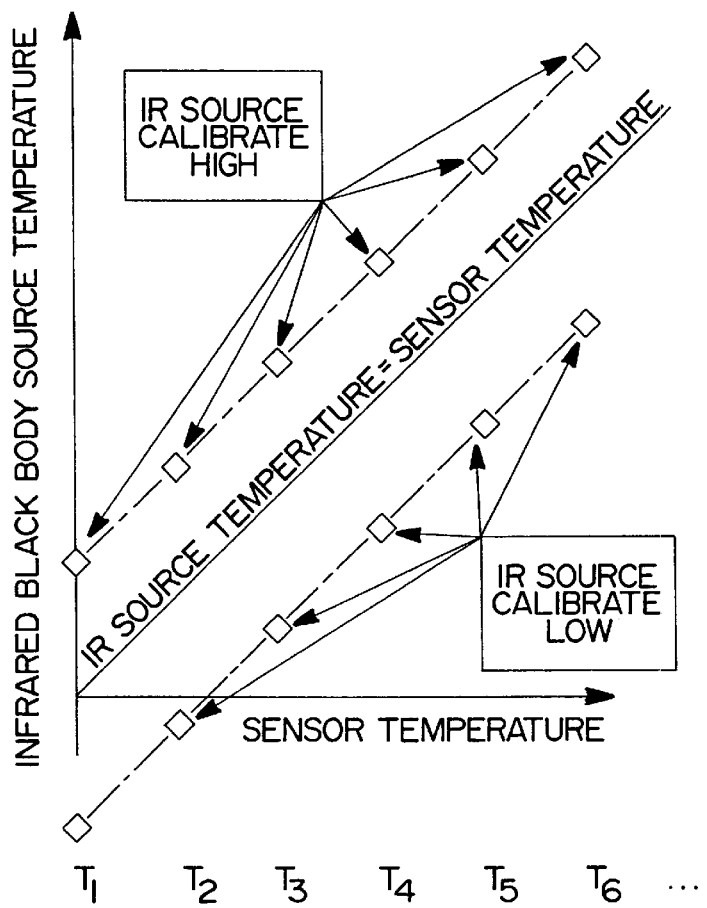
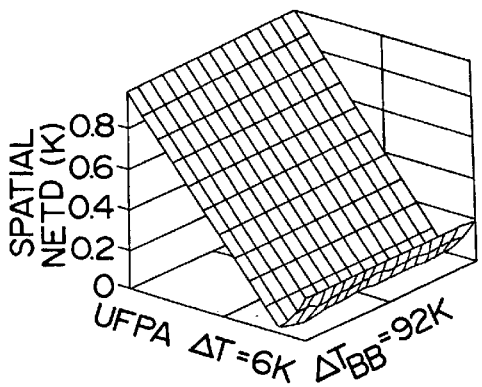
FIG 8
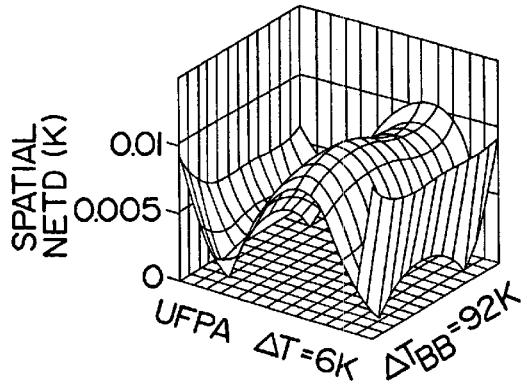
FIG 9

INFRARED SENSOR TEMPERATURE COMPENSATED RESPONSE AND OFFSET CORRECTION

TECHNICAL FIELD

The present invention relates to infrared sensitive focal plane sensors, and more particularly, to a system that performs a detector array gain and offset correction that also automatically compensates for changes in the operating temperature of the infrared focal plane sensor.

BACKGROUND OF INVENTION

Most infrared sensors currently use an active means to set and regulate the operating temperature of the focal plane. With sensors operating at or near room temperature, this is typically accomplished by means of a temperature control system consisting of temperature sensing devices, a thermal-electric cooler, and temperature control electronics. The time required to establish the desired operating temperature introduces a significant time delay between sensor turn-on and imaging. In addition, the resulting added power, cost, and complexity of the temperature control system combine to significantly limit the potential market for the use of infrared sensor technology.

Focal plane response and offset non-uniformities appear on the output display of an imaging sensor as fixed pattern noise. The non-uniformities are described as noise because they introduce undesirable information in the displayed image. The non-uniformities are described as a fixed pattern because their characteristics do not change (or change relatively slowly) with time. Current infrared sensor systems typically utilize response and offset error correction techniques to minimize the level of fixed pattern noise. With these systems, the response and offset errors remain relatively constant since the infrared sensitive focal planes are maintained at tightly controlled operating temperatures and biases. In current infrared camera systems, however, the operation of the camera can be delayed while the system waits for temperature stabilization.

Accordingly, it is desirable to provide an uncooled infrared sensor with the capability to perform response and offset correction as a function of the sensor's operating temperature.

SUMMARY OF THE INVENTION

The method and apparatus of the present invention relates to an algorithm, and a logical functional architecture for achieving stable operation of infrared sensitive focal plane sensors without the need for active operating temperature stabilization. From a practical stand point, the present invention is also generally applicable to any system that has an approximately linear response that exhibits unwanted sensitivity to operating temperature changes, and whose performance benefits from response and offset correction. The present invention is directed to a correction method for use with an infrared sensor incorporating a focal plane that provides a video input signal, as well as an electrical measurement of the infrared sensor's operating temperature. Response and offset correction coefficients are then calculated for each detector element of the focal plane array using a linear temperature interpolation of a set of calibrated response and offset correction coefficients that were previously measured and stored into sensor memory during an initial sensor level calibration. The interpolated response and offset correction coefficients are then applied to the video input signal.

BRIEF DESCRIPTION OF THE DRAWINGS

The various advantages of the present invention will become apparent to one skilled in the art by reading the following specification and subjoined claims and by referencing the following drawings in which:

FIG. 4 shows a representative set of infrared black body source and focal plane array operating temperatures that would be used in the initial calibration of the sensor according to the principles of the present invention.

FIGS. 8 and 9 illustrate uncooled infrared sensor temperature compensated performance simulation modeling results (FIG. 9) versus the level of spatial patterning obtained with a conventional gain/offset correction algorithm (FIG. 8).

DETAILED DESCRIPTION OF THE PREFERRED EMBODIMENTS

Figure 1:
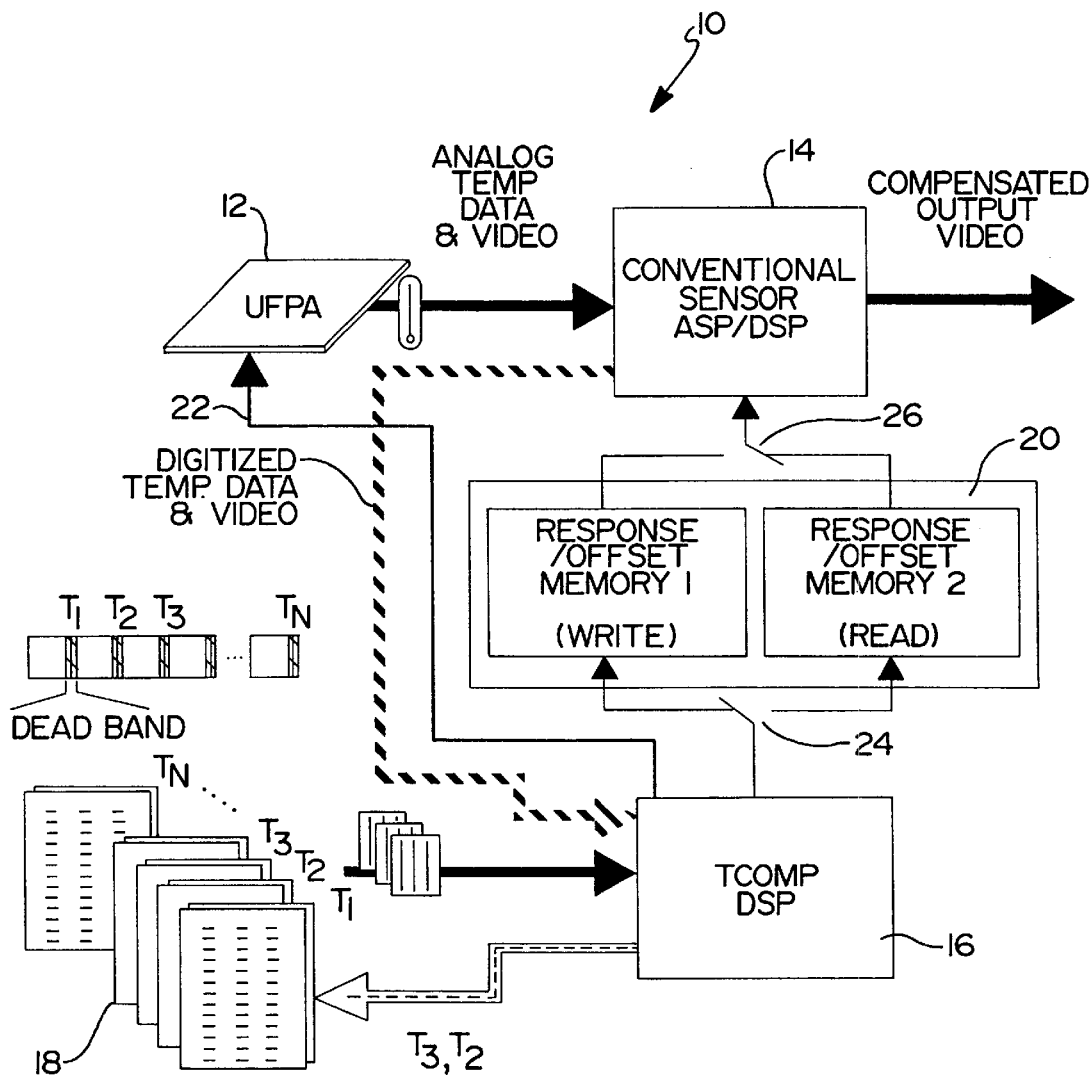
FIG. 1 is a dataflow diagram of the temperature compensated performance signal processing architecture according to the principles of the present invention.
Figure 2:
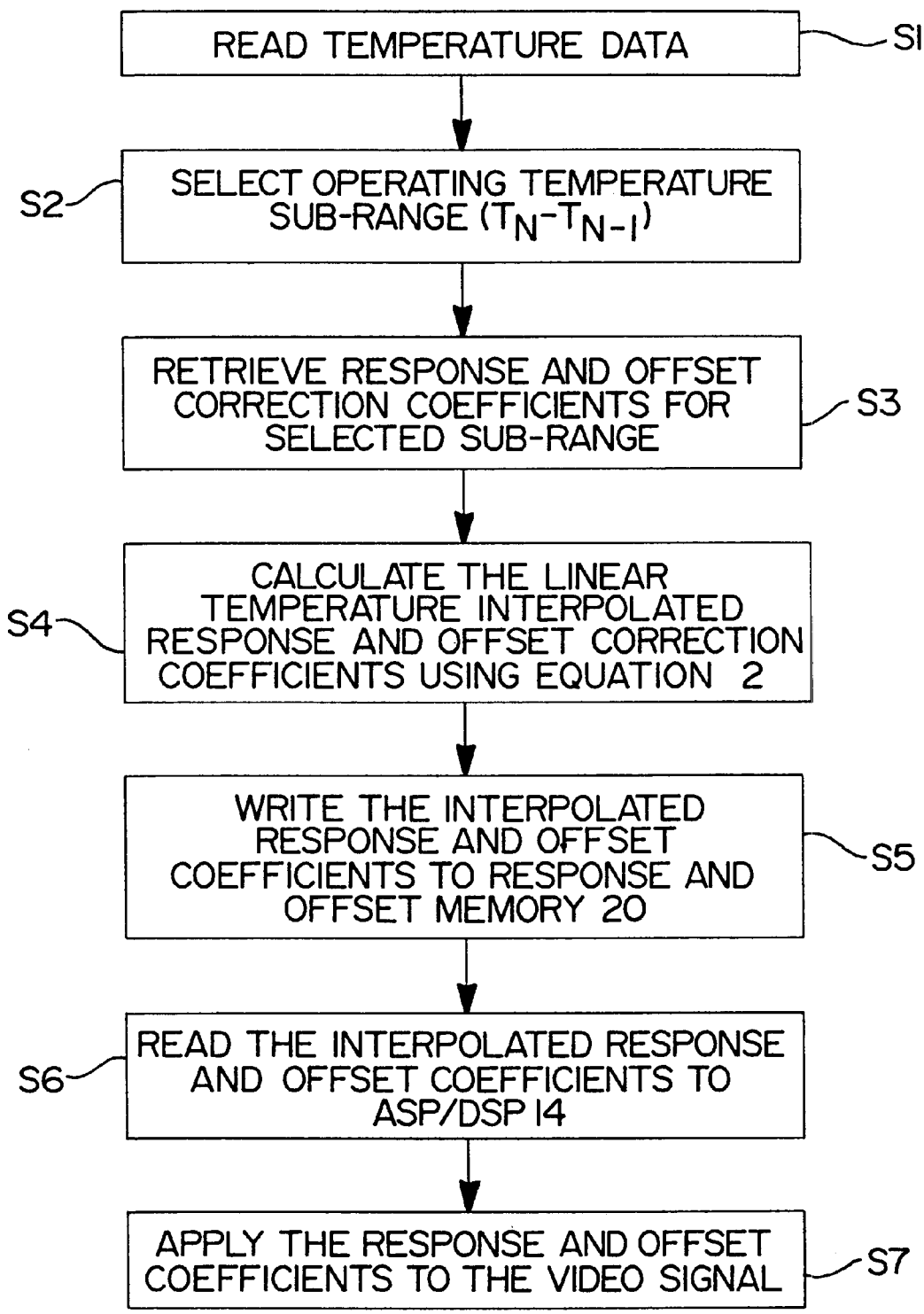
FIG. 2 in a flowchart of the steps performed during the operation of the infrared sensor according to the principles of the present invention.

Referring to FIG. 1 and 2, the correction method and system for an uncooled infrared sensor will be described. With reference to FIG. 1, the system 10 of the present invention includes an uncooled focal plane array 12 that provides a video input signal and temperature data to a conventional sensor analog signal processor/digital signal processor (ASP/DSP) 14. The two functions of the conventional ASP/DSP 14 that are required for the present invention are 1) an analog-to-digital conversion of the focal plane's $$S_{P-S}(\Phi)_n = \frac{S(\Phi)_n - S(\Phi 1)_n}{S(\Phi 2)_n - S(\Phi 1)_n} \qquad \text{Equation 1}$$

video and temperature data signals, and 2) a conventional response and offset correction of the focal plane array's digitized video signal. The defining equation for a conventional response and offset correction algorithm is shown in Equation 1. Here, $S(\Phi)_n$ is the response of the focal plane array's $n^{th}$ detector element to an infrared irradiance level $\Phi$, $S_{P-S}(\Phi)_n$ represents the corrected response for the $n^{th}$ detector element, and $S(\Phi 1)_n$ and $S(\Phi 2)_n$ represent suitable time averages of the $n^{th}$ detector element's responses to the two infrared calibration levels ($\Phi 1$ and $\Phi 2$) that were generated previously during an initial sensor calibration.

The system 10 also includes a temperature compensation (TCOMP) digital signal processor 16, which receives temperature compensation coefficients from the TCOMP coefficient memory 18 that is described in greater detail herein. Based upon the detected temperature of the uncooled focal plane array 12, the temperature compensation digital signal processor 16 calculates temperature compensated response and offset coefficients, which are stored in gain/offset memory 20 as will be described in more detail herein.

The temperature compensated performance system and method of the present invention performs a detector array response and offset correction function that also automatically compensates for changes in operating temperature. This eliminates the need for focal plane and sensor temperature regulation. The mathematical form of the temperature compensated performance algorithm is shown in Equation 2 below as follows:

$$S_{TCOMP}(\phi, T)_n = \frac{S(\phi, T)_n - S(\phi 1, T_1)_n - \left(\frac{T - T_1}{T_2 - T_1}\right)(S(\phi 1, T_2)_r - S(\phi 1, T_1)_n)}{S(\phi 2, T_1)_n - S(\phi 1, T_1)_n + \left(\frac{T - T_1}{T_2 - T_1}\right)(S(\phi 2, T_2)_n - S(\phi 1, T_2)_n - S(\phi 2, T_1)_n + S(\phi 1, T_1)_n)}$$

Equation 2 where $S(\Phi,T)_n$ is the response of the sensor's $n^{th}$ detector element to an input $\Phi$, with the focal plane array and sensor operating at a temperature T. The variables $\Phi 1$ and $\Phi 2$ are the two input levels to the sensor that are used for initial calibration. The initial temperature compensated performance calibration is performed by measuring the sensor's response to the input levels $\Phi 1$ and $\Phi 2$ at each of the two operating temperatures $T_1$ and $T_2$. The measured response values are then stored in memory for subsequent use in the temperature compensated performance algorithm (Equation 2). The operating temperature of the sensor 12 is directly measured in real time, and applied to the algorithm (Equation 2). To reduce the computational load during operation, the only values that need to be stored from the initial TCOMP calibration are $S(\Phi 1,T_1)_n$, $(S(\Phi 2,T_1)_n-S(\Phi 1,T_1)_n)$, $(S(\Phi 1,T_2)_n-S(\Phi 1,T_1)_n)$, $(S(\Phi 2,T_2)_n-S(\Phi 1,T_2)_n-S(\Phi 2,T_1)_n-S(\Phi 1,T_1)_n)$, $T_2$ and $T_1$. In this way, the TCOMP algorithm can be performed with only two multiplies and two adds for each detector element. The final response and offset correction calculation, which is performed in the conventional ASP/DSP 14 at the full video rate, requires only one multiply and one add per detector element.

One of the advantages of the TCOMP algorithm of the present invention is that its output is equivalent to that of a conventional response and offset correction algorithm at either temperature $T_1$ or $T_2$. Furthermore, at any temperature (T) between $T_1$ and $T_2$ the correction applied to each detector element of the focal plane array has essentially the same mathematical form as Equation 1. Thus, the hardware and firmware already developed for the conventional algorithm (described in FIG. 1 as the ASP/DSP 14) remains applicable to the TCOMP algorithm of the present invention. In addition, because the thermal time constants of both the focal plane and the sensor will typically be much longer than the focal plane's frame time, the TCOMP temperature interpolation (Equation 2) can be performed at a significantly lower rate than the detector element video address rate.

As long as the temperature dependence of the focal plane's (12) response remains nearly linear, the precision of the corrected response that is provided by the basic TCOMP algorithm (Equation 2) is sufficient. If there is a significant level of response non-linearity, then the precision of the corrected response can degrade. This could limit the effective temperature correction range. With the TCOMP algorithm of the present invention, this potential limitation is overcome by dividing the overall operating temperature range into sub-ranges over which the response non-linearity remains relatively small. Separate temperature compensation calibrations are then performed for each sub-range, and stored in the TCOMP coefficient memory 18. The TCOMP coefficient memory is organized like a book. Each page corresponds to one of the selected temperature sub-ranges, and contains the four corresponding TCOMP coefficients for each of the detector elements and the two temperatures that define the sub-range.

During operation, the measured real time temperature is used to select the optimum sub-range table ($T_1$ through $T_N$), and the selected sub-range table is then used to support the TCOMP algorithm. Transitions between the sub-ranges $T_1$ through $T_N$ are "smoothed-out" by introducing an overlap, or switch-point dead band, between the temperature sub-ranges $T_1$ through $T_N$. With reference to FIGS. 1 and 2, the operation of the temperature compensation system of the present invention will now be described. As shown in FIG. 1, the temperature data and an input video signal are received from the uncooled focal plane array 12 by the conventional ASP/DSP 14. The temperature data is then read at Step S1 by the temperature compensation digital signal processor (TCOMP DSP) 16. The TCOMP DSP 16 then selects the operating temperature sub-range at Step S2 and retrieves the appropriate response/offset correction coefficient from the selected sub-range stored in the TCOMP coefficient memory 18 in Step S3. The TCOMP DSP 16 then calculates the linear temperature interpolated response and offset correction coefficient utilizing the TCOMP algorithm (Equation 2) at Step S4. The interpolated response and offset correction coefficients are then stored in memory 20 at Step S5.

In the present invention the gain/offset memory 20 is partitioned into two sub-units (Memory 1 and Memory 2). The switches 24 and 26 allow the temperature interpolated TCOMP coefficients previously stored in one of the memory units to be read to the ASP/DSP 14, while the temperature interpolated TCOMP coefficients that are now being calculated in the TCOMP DSP 16 are being written to the other memory unit. In other words, in the present invention the ASP/DSP 14 executes Equation 1 on the digitized focal plane array video, while the TCOMP DSP 16 calculates the temperature interpolated TCOMP coefficients of Equation 2. The response/offset memory allows the TCOMP DSP 16 to be operated at a lower data rate, with the lower limit of the TCOMP DSP data rate determined by the thermal time constants of the focal plane array and the sensor.

After the TCOMP temperature interpolated response and offset coefficients are written to the memory 20 at Step S5, the coefficients are read to the ASP/DSP 14 at Step S6. The TCOMP temperature interpolated response and offset coefficients are then applied to the video signal at Step S7 by the ASP/DSP 14, as is known in the art. Thus, the digital output video signal from the ASP/DSP 14 is now corrected for response and offset non-uniformities as a function of focal plane operating temperature.

In the event that slow temporal drift affects sensor performance, a conventional single-point detector element offset calibration, which can be performed at sensor powerup and repeated as often as desired, can be added to further improve the performance of TCOMP response and offset compensation, as applies to the present invention. Techniques for a conventional single-point detector element offset calibration are known in the art.

Figure 3:
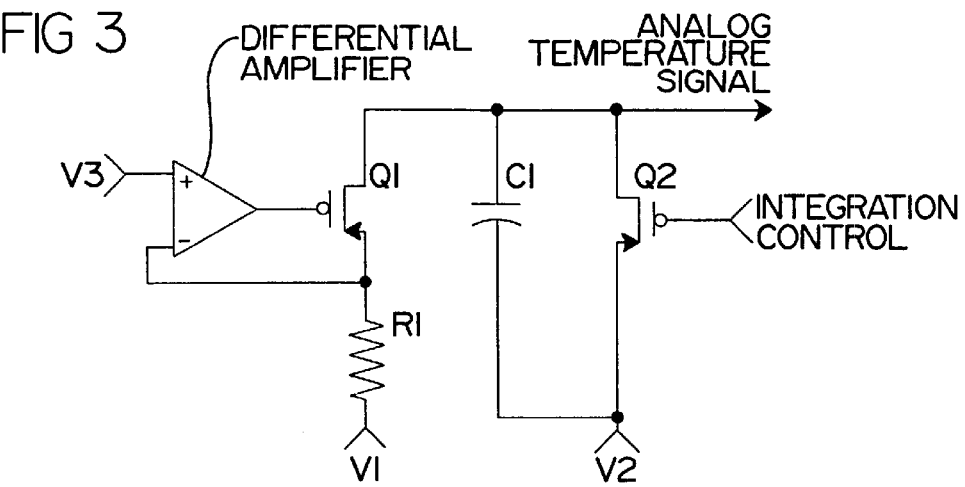
FIG. 3 shows a circuit diagram for an on-chip temperature sensing network in accordance with the requirements and principles of the present invention.

Quantitative electrical measurements of the focal plane's operating temperature, as required by the present invention, can be obtained in several ways. For example, a temperature sensing device, such as a diode or a resistance thermometer, can be located within the same vacuum package that contains the focal plane array, as has been demonstrated and is known in the art. In the present invention the temperature measurement function is integrated directly onto the focal plane array chip, as shown FIG. 3. The resistance thermometer R1 is a resistance bolometer element that is located on the focal plane array chip and has been heat sunk to the focal plane array's substrate. The network, consisting of the transistor Q1 and the differential amplifier, function together as a Buffered Direct Injection (BDI) circuit, which provides a constant voltage bias to the resistance thermometer RI and buffers the signal current from R1. BDI circuits are known in the art. The signal current from the transistor Q1 is then integrated on the integration capacitor C1, which determines the signal-to-noise ratio of the analog temperature signal by establishing an electrical frequency band-pass. The transistor Q2 acts as a switch, which controls both integration time and integrator reset through the action of the integration control signal. The analog temperature signal is then sampled and multiplexed onto the focal plane's output video, where it will typically appear during horizontal and/or vertical blanking. Sampled values of analog temperature signal can be generated during every line time of the focal plane's video output. This allows several independent values to be generated for the same integration time so that sample averaging can be used to further improve the signal-to-noise ratio. Furthermore, the integration time can be changed between line times to provide a range of sensitivity levels for temperature measurement. The capability to change integration time within a frame of the focal plane array's readout is important to the present invention because the resistance of R1 can change by more than a factor of ten over a focal plane operating temperature range from −30° C. to +60° C.

Some or all of the functions shown in FIG. 1 can be integrated onto the focal plane array chip, with the practical upper limit of on-chip integration being determined by integrated circuit design rules and the maximum die reticle size supported by the silicon integrated circuit wafer process foundry. In the present invention, however, it is important to incorporate at least a six-bit resolution detector element offset correction capability on chip, methods for which are known in the art. This is typically accomplished by first determining an appropriate set of detector element offset correction coefficients during the initial sensor calibration, and storing these values in non-volatile sensor memory. During subsequent sensor operation these values are read to the focal plane array, as shown in FIG. 1 on the data bus 22. The values are then used on the focal plane array chip to correct, at least partially, for detector element offset patterning. Since most of the detector element offset patterning is now removed from the focal plane's output video, higher on-chip signal gains can be used, and the focal plane's infrared response dynamic range is improved. In the present invention this capability is utilized and extended through the use of one or more detector element "coarse" offset tables that are selected from the TCOMP memory 18 during operation in the same way as described above. The required number of detector element "coarse" offset tables depends on the degree to which the focal plane's detector element offset patterning changes as a function of temperature.

The TCOMP response and offset coefficients and the detector element "coarse" offset coefficients, which are contained in the TCOMP coefficient memory 18, are generated by an initial set of sensor calibration measurements. The initial sensor calibration measurements that are performed in the present invention will now be described with the help of FIG. 4. FIG. 4 shows a set of paired sensor temperatures, and infrared black body source temperatures, that are illustrative of the conditions required during the initial sensor calibration measurements. The sensor temperature is indicated by the horizontal axis, and the vertical axis indicates the infrared black body source temperature. The diamonds indicate the temperature pairs that would correspond to each calibration measurement condition. The measurements of the detector element "coarse" offset coefficients are performed first. Since uncooled thermal detectors will typically exhibit essentially no net thermal radiation response along the line marked "IR Source Temperature= Sensor Temperature", the best IR source and sensor temperature conditions for measuring the detector element "coarse" offset coefficients usually occur on (or near) this line. The measurement of several frame times of the focal plane array's detector element responses is performed at the temperatures $T_1$, $T_2$, $T_3$, $T_4$, $T_5$, $T_6$ etc. The detector element "coarse" offset coefficients for each of these sensor temperatures are then calculated by using suitable time-averages of the detector element responses, which can be performed using any of a number of algorithms and methods known in the art. Once the detector element "coarse" offset coefficients have been determined and are being applied to the focal plane array, the TCOMP response and offset coefficients are determined for each of the selected operating conditions, as illustrated in FIG. 4. For each selected operating condition, the focal plane array measurements and calculations are essentially identical to the measurements and calculations performed in the determination of the detector element "coarse" offset coefficients. The averaged response values are then combined to form the coefficient terms $S(\Phi1,T_1)_n$, $(S(\Phi2,T_1)_n-S((\Phi1,T_1)_n)$, $(S(\Phi1,T_2)_n-S(\Phi1,T_1)_n)$, $(S(\Phi2,T_2)_n-S(\Phi1,T_2)_n+S(\Phi2,T_1)_n-S(\Phi1,T_1)_n)$, and the constant $(T_2-T_1)$. In the present invention this method for selecting the desired pairs of operating temperature conditions is used to optimize the performance of the response and offset correction over each sub-range of infrared source illumination and focal plane array operating temperature.

Figure 6:
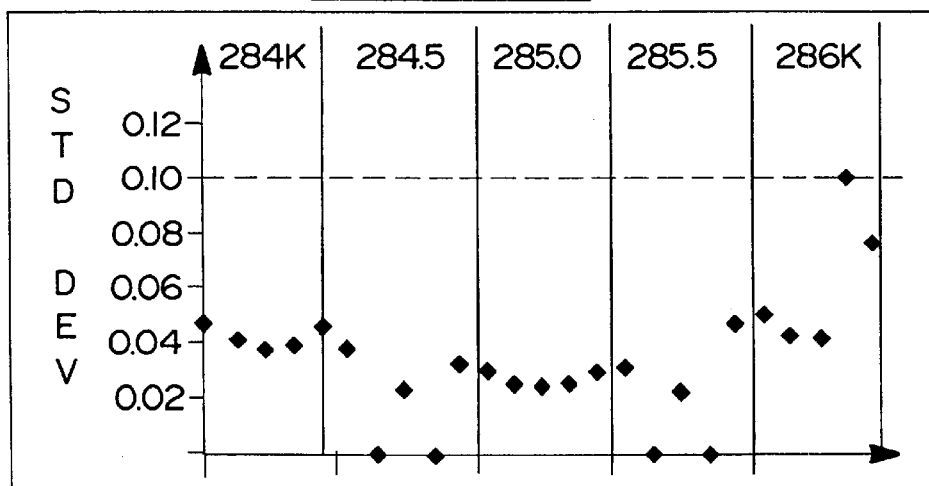
Figure 7:
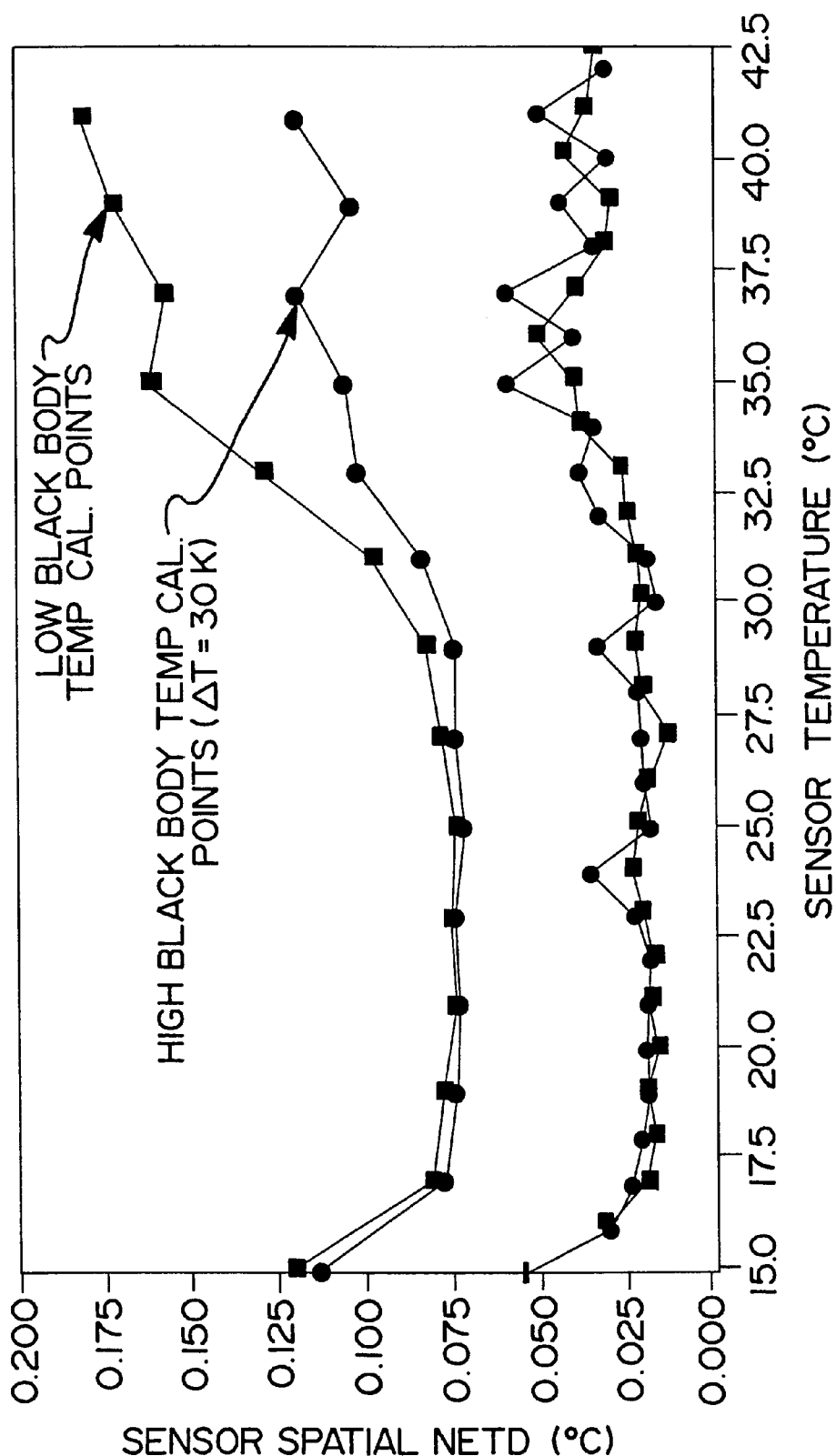
FIG. 7 shows the results obtained from a sensor fully demonstrating, in real time, the concepts embodied in the present invention.

The basic temperature compensation concept has been successfully demonstrated experimentally, and has been confirmed further by Monte Carlo analytical simulations. In the initial experimental demonstration, previously measured and recorded uncooled infrared focal plane array video and temperature measurement data were processed by a PC that was used to emulate a TCOMP sensor (i.e. FIG. 1). Subsequently, sensor electronics were designed, built and demonstrated that directly implements FIG. 1 in real-time. For the Monte Carlo analytical simulations a model was developed for the focal plane array, the infrared black body scene and optics, the calibration of the TCOMP sensor, and the operation of the TCOMP response and offset compensation algorithm. The most significant focal plane array and sensor parameters that are subject to statistical variation were modeled by Monte Carlo simulation methods. The key results obtained from the initial experimental demonstration are summarized in FIGS. 5 and 6. An example of the significant results from the real time sensor demonstration is shown in FIG. 7. Representative results from the Monte Carlo analytical simulations are shown in FIGS. 8 and 9.

Figure 5:
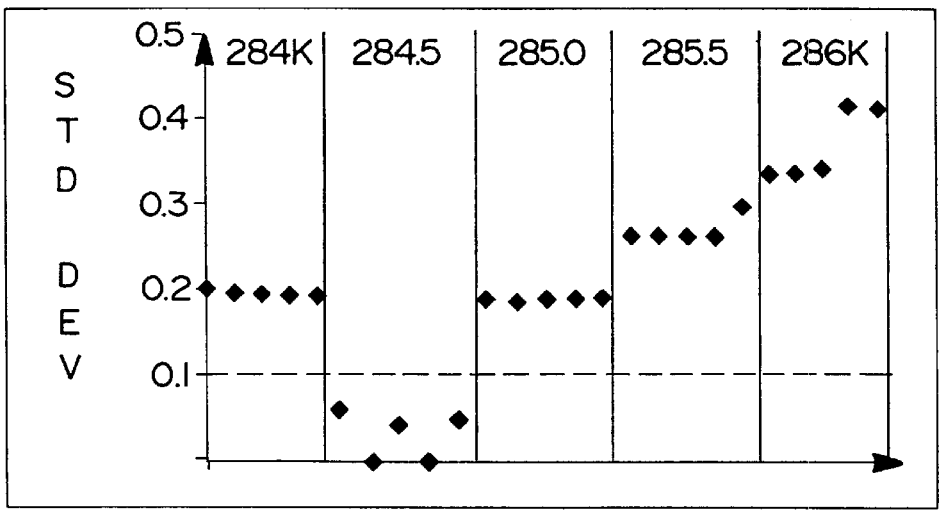
FIGS. 5 and 6 show the results of the temperature compensated performance algorithm utilized with an uncooled focal plane (FIG. 6) in comparison with the spatial patterning offset levels obtained with a conventional gain and offset correction algorithm (FIG. 5).

The initial demonstration of the TCOMP response and offset compensation concept will now be described with the aid of FIGS. 5 and 6. This demonstration was accomplished by first recording response data from a Boeing U3000 uncooled focal plane array as a function of both the focal plane array's operating temperature and the temperature of the infrared black body source. The numbers running across the tops of FIGS. 5 and 6 indicate the focal plane array operating temperatures used for the demonstration. At each operating temperature focal plane response was measured for five infrared black body source temperatures, with the average focal plane response values at each of the operating temperatures shown by the five diamonds. Using this previously recorded focal plane response data a conventional 2-point response and offset calibration was performed at the focal plane operating temperature of 284.5 Kelvin. Equation 1 was then applied to the stored video data for each of the operating temperatures and IR illumination levels, and the level of residual pattern noise was determined by the standard deviation of the corrected video. FIG. 5 clearly shows that the level of pattern noise increased more as the focal plane operating temperature deviated more from the initial calibration temperature. FIG. 6 shows that the application of the TCOMP response and offset algorithm effectively reduced the level of residual pattern noise by as much as a factor of ten. The two TCOMP calibration temperatures were 284.5 K and 285.5 K, as can be seen in FIG. 6.

A full functional experimental demonstration of the present invention has also been performed. In this case, a sensor was developed and demonstrated that implements FIG. 1 in real-time. FIG. 7 shows the level of spatial pattern noise obtained over a focal plane operating temperature ranging from 15° C. to 42.5° C. In this case the level of spatial patterning was expressed in terms of the spatial Noise Equivalent Temperature Difference (NETD). The spatial NETD is equivalent to the black body temperature difference in the scene that would be required to generate a focal plane response equal to the level of the spatial patterning in the response after Equation 2 was applied to the digital video signal. The significant reduction in the spatial NETD that was seen between the upper and lower data plots was attributed to improvements in calibration techniques.

Monte Carlo analytical simulation modeling results of the present invention are shown in FIGS. 8 and 9. The simulation model analytically represents the resistance bolometer detectors and the on-chip focal plane array readout electronics, and it characterizes their response to electrical and infrared stimulus, as appropriate. The first step in each focal plane array analysis is to model the variations in the physical and electrical properties of the bolometer detector elements, which are the dominant sources of the statistical variations. This is accomplished by Monte Carlo simulation. The model then simulates a detector element coarse offset coefficient calibration for the statistical set of detector elements that have been generated by the Monte Carlo simulation, and these coarse offset coefficients are applied to the set of detector elements. Next, a TCOMP response and offset calibration is simulated, and the resulting TCOMP coefficients are applied to a simulation of the TCOMP DSP 18, as shown in FIG. 1. Both the focal plane operating temperature and the infrared black body source temperature are then varied, and the TCOMP response calculated for the statistical set of detector elements generated by the Monte Carlo simulation. Finally, the standard deviation of the TCOMP response is calculated for each pair of IR source and focal plane temperatures, and the spatial NETD is calculated using the standard deviation and specified sensor optics parameters. FIG. 8 shows the spatial NETD (F/1 Optics) obtained for the case of a conventional response and offset correction (Equation 1). In the simulation analysis this was done by simply setting $(T-T_1)=0$ in Equation 2. The result is clear, because the spatial NETD can be seen to increase progressively to about 1 K as the focal plane array's operating temperature deviates from the initial calibration temperature. The initial focal plane array calibration temperature can also clearly be seen in the surface plot of the spatial NETD of FIG. 8. FIG. 9 shows that more than a 100:1 improvement in the spatial NETD resulted when the TCOMP response and offset correction was applied over a focal plane operating temperature range of 6 K. In this case, $\Delta T=6$ K corresponds to a single operating temperature sub-range. The entire focal plane array operating temperature range is effectively covered by stepping through about 16 of these sub-ranges. Here the simulation model also helps to estimate the likely sub-range $\Delta T$ for many combinations of bolometers and focal plane array readout electronics.

It is estimated that the power consumption of a thermal-electric cooler and its temperature control electronics is between 1.5 and 5 watts, depending on sensor configuration and design. This power is estimated to be about equal to the sensor electronics power for an optimized integrated circuit design. In other words, elimination of the thermo electric cooler would reduce total sensor power by about 50 percent. Elimination of the thermoelectric cooler and its associated electronics is estimated to reduce the sensor costs by several hundred dollars and reduce sensor size both by eliminating the thermoelectric control electronics and by reducing the number of batteries required. The reduced power, cost and size of the uncooled infrared sensor according to the present invention opens a range of man-portable and unattended operation applications that are not currently being served effectively with current technology.

Those skilled in the art can appreciate from the foregoing description that the broad teachings of the present invention can be implemented in a variety of forms. Therefore, while this invention has been described in connection with particular examples thereof, the true scope of the invention should not be so limited since other modification will become apparent to the skilled practitioner upon a study of the drawings, specification, and following claims.

What is claimed is:

1. A method for correcting a video signal of an infrared sensor that varies in accordance with a temperature of the sensor, comprising the steps of:

providing a video input signal representative of an operating temperature of an infrared sensor;

calculating temperature based correction terms using the operating temperature of said sensor and a temperature based interpolation of predetermined calibrated correction terms, wherein the calibrated correction terms are sensor response values at predetermined operating temperatures; and applying the calculated temperature based correction terms to the video input signal to thereby correct for variations in the video signal caused by variations in the temperature of the sensor.

2. The method according to claim 1, wherein said temperature based correction terms include response and offset coefficients.

3. The method according to claim 2, wherein at least some response and offset correction is performed on a focal plane array of the infrared sensor.

4. The method according to claim 1, further comprising the step of dividing an overall operating temperature range of the sensor into smaller predetermined sub-ranges which generally exhibit an approximately linear temperature response characteristic, and wherein said predetermined calibrated correction terms are provided for each of said predetermined sub-ranges.

5. A method for correcting a video output signal of an infrared sensor that varies in accordance with a temperature of the sensor, comprising the steps of:

dividing an overall operating temperature range of the infrared sensor into smaller predetermined sub-ranges which generally exhibit an approximately linear temperature response characteristic and storing predetermined calibrated response and offset error correction terms for each of said predetermined sub-ranges;

providing a video input signal indicative of an operating temperature of an infrared sensor;

determining a sub-range for the operating temperature of said infrared sensor, and selecting predetermined calibrated response and offset error correction terms for said sub-range;

calculating temperature based response and offset correction terms using the operating temperature of said sensor and a temperature based interpolation of said predetermined calibrated response and offset correction terms; and applying the calculated temperature based response and offset error correction terms to the video input signal to thereby correct for variations in the video caused by variations in the temperature of said infrared sensor.

6. The method, according to claim 5, wherein at least some response and offset correction is performed on the focal plane array of the infrared sensor.

7. An imaging system, comprising:

an uncooled focal plane array;

a temperature sensor for measuring a temperature of the focal plane array;

memory storage means for storing predetermined calibrated temperature based video signal correction terms, wherein the calibrated correction terms are focal plane array response values at predetermined operating temperatures; and signal processing means for receiving a video input signal from said focal plane array, calculating interpolated correction terms based upon temperature data received from said temperature sensor and said predetermined calibrated temperature based video signal correction terms, and applying the interpolated correction terms to the video input signal received from said focal plane array.

8. The imaging system according to claim 7, wherein said focal plane array and said temperature sensor are provided in an integrated circuit chip.

9. The imaging system according to claim 8, further comprising a digital databus for communicating video signal correction data to said integrated circuit chip from said signal processing means.

\* \* \* \* \*

UNITED STATES PATENT AND TRADEMARK OFFICE
CERTIFICATE OF CORRECTION

PATENT NO. : 6,433,333 B1
DATED : August 13, 2002
INVENTOR(S) : Philip E. Howard It is certified that error appears in the above-identified patent and that said Letters Patent is hereby corrected as shown below:

Column 3,
Line 36, the third occurrence of "-" should read -- + --.

Column 4,
Line 33, "through $T_N$" should not be italicized or subscripted.

Signed and Sealed this

Eighteenth Day of February, 2003

JAMES E. ROGAN
*Director of the United States Patent and Trademark Office*